(12) United States Patent
Raza et al.

(10) Patent No.: US 9,756,404 B2
(45) Date of Patent: Sep. 5, 2017

(54) DATA CENTER PATH SWITCH WITH IMPROVED PATH INTERCONNECTION ARCHITECTURE

(71) Applicant: Fiber Mountain, Inc., Cheshire, CT (US)

(72) Inventors: Mohammad H. Raza, Cheshire, CT (US); David G. Stone, Irvine, CA (US); Aristito Lorenzo, Plantsville, CT (US); Ronald M Plante, Prospect, CT (US); John R Lagana, West Nyack, NY (US)

(73) Assignee: Fiber Mountain, Inc., Cheshire, CT (US)

( * ) Notice: Subject to any disclaimer, the term of this patent is extended or adjusted under 35 U.S.C. 154(b) by 0 days.

(21) Appl. No.: 14/790,594

(22) Filed: Jul. 2, 2015

(65) Prior Publication Data

US 2016/0007102 A1 Jan. 7, 2016

Related U.S. Application Data

(60) Provisional application No. 62/020,894, filed on Jul. 3, 2014.

(51) Int. Cl.
*H04J 14/00* (2006.01)
*H04Q 11/00* (2006.01)
*H04L 12/931* (2013.01)
*H04L 12/933* (2013.01)

(52) U.S. Cl.
CPC ..... *H04Q 11/0005* (2013.01); *H04L 49/1515* (2013.01); *H04L 49/356* (2013.01); *H04Q 2011/005* (2013.01); *H04Q 2011/0039* (2013.01); *H04Q 2011/0056* (2013.01); *H04Q 2011/0058* (2013.01)

(58) Field of Classification Search
None
See application file for complete search history.

(56) References Cited

U.S. PATENT DOCUMENTS

| | | | |
|---|---|---|---|
| 5,101,151 A | 3/1992 | Beaufils et al. |
| 5,457,556 A | 10/1995 | Shiragaki |
| 5,493,565 A | 2/1996 | Hanson et al. |
| 5,838,681 A | 11/1998 | Bonomi et al. |
| 5,892,770 A | 4/1999 | Wolf et al. |
| 6,067,585 A | 5/2000 | Hoang |

(Continued)

FOREIGN PATENT DOCUMENTS

WO 2013171042 A1 11/2013

OTHER PUBLICATIONS

International Search Report and Written Opinion, mailed in PCT/US15/12795 on by ISA/US dated May 18, 2015.

(Continued)

*Primary Examiner* — Tesfaldet Bocure
(74) *Attorney, Agent, or Firm* — Wissing Miller LLP

(57) ABSTRACT

A data center path switch architecture permits path switching of the signal path of incoming signals to one or more output paths in real time without the need for manual intervention, and without delays associated with current data center network switches. In this architecture, a switching core capable of switching signals directly from the ingress of the switching core to alternate destination ports in real time, either under software or hardware control.

18 Claims, 10 Drawing Sheets

(56) References Cited

U.S. PATENT DOCUMENTS

| | | | |
|---|---|---|---|
| 6,188,702 B1 | 2/2001 | Tornetta et al. | |
| 6,243,510 B1 | 6/2001 | Rauch | |
| 6,665,495 B1* | 12/2003 | Miles | H04L 45/00 370/351 |
| 6,973,229 B1* | 12/2005 | Tzathas | G06F 8/65 385/16 |
| 6,980,725 B1 | 12/2005 | Swieconek | |
| 7,106,966 B1* | 9/2006 | Lalonde | G02B 6/29308 385/17 |
| 7,209,453 B1* | 4/2007 | Yun | H04L 49/557 370/242 |
| 7,226,217 B1 | 6/2007 | Benton et al. | |
| 7,272,309 B1* | 9/2007 | Tamil | H04L 45/62 370/351 |
| 7,277,425 B1 | 10/2007 | Sikdar | |
| 7,409,158 B2* | 8/2008 | Lee | H04J 14/0209 398/51 |
| 7,492,714 B1 | 2/2009 | Liao et al. | |
| 7,590,102 B2* | 9/2009 | Varma | H04L 49/101 370/351 |
| 7,606,494 B1 | 10/2009 | Weston-Dawkes et al. | |
| 7,653,057 B1* | 1/2010 | Fromm | H04L 47/10 370/252 |
| 7,772,975 B2 | 8/2010 | Downie et al. | |
| 7,782,202 B2 | 8/2010 | Downie et al. | |
| 7,831,733 B2* | 11/2010 | Sultan | H04L 45/02 709/238 |
| 7,965,186 B2 | 6/2011 | Downie et al. | |
| 8,050,257 B2* | 11/2011 | Beshai | H04L 49/357 370/230 |
| 8,138,925 B2 | 3/2012 | Downie et al. | |
| 8,238,754 B2* | 8/2012 | Soto | H04B 10/2503 398/100 |
| 8,264,366 B2 | 9/2012 | Chamarti et al. | |
| 8,421,626 B2 | 4/2013 | Downie et al. | |
| 8,498,297 B2* | 7/2013 | Bragg | H04L 45/54 370/386 |
| 8,576,839 B2* | 11/2013 | Beshai | H04L 45/60 370/380 |
| 8,983,292 B2* | 3/2015 | Testa | H04Q 11/0005 370/380 |
| 9,030,947 B2* | 5/2015 | Xu | H04L 67/34 370/248 |
| 9,100,313 B1* | 8/2015 | Mazzola | H04L 49/101 |
| 9,159,012 B2 | 10/2015 | Downie et al. | |
| 9,277,302 B2* | 3/2016 | Beshai | H04L 49/15 |
| 2001/0015839 A1 | 8/2001 | Koh et al. | |
| 2003/0026205 A1 | 2/2003 | Mullendore et al. | |
| 2003/0030866 A1 | 2/2003 | Yoo | |
| 2004/0029417 A1 | 2/2004 | Engel et al. | |
| 2006/0018329 A1 | 1/2006 | Nielsen et al. | |
| 2006/0148279 A1 | 7/2006 | German et al. | |
| 2006/0186926 A1 | 8/2006 | Yager et al. | |
| 2006/0251419 A1 | 11/2006 | Zadikian et al. | |
| 2007/0291535 A1 | 12/2007 | Eberle et al. | |
| 2008/0101229 A1 | 5/2008 | Meleis et al. | |
| 2009/0074414 A1 | 3/2009 | Miles et al. | |
| 2009/0226181 A1 | 9/2009 | Fingler et al. | |
| 2010/0098412 A1 | 4/2010 | Boyd et al. | |
| 2010/0129078 A1 | 5/2010 | Weston-Dawkes et al. | |
| 2010/0142544 A1 | 6/2010 | Chapel et al. | |
| 2010/0211664 A1 | 8/2010 | Raza et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2010/0266117 A1 | 10/2010 | Enge et al. | |
| 2010/0329066 A1* | 12/2010 | Chin | G11C 7/1006 365/230.05 |
| 2011/0092100 A1 | 4/2011 | Coffey et al. | |
| 2011/0116748 A1 | 5/2011 | Smrha et al. | |
| 2011/0188383 A1 | 8/2011 | Koziy et al. | |
| 2011/0228473 A1 | 9/2011 | Anderson et al. | |
| 2011/0255829 A1 | 10/2011 | Anderson et al. | |
| 2012/0008945 A1 | 1/2012 | Singla et al. | |
| 2012/0069839 A1 | 3/2012 | Kunz et al. | |
| 2012/0219005 A1 | 8/2012 | Durve et al. | |
| 2012/0243554 A1 | 9/2012 | Sybesma et al. | |
| 2012/0246362 A1 | 9/2012 | Anne et al. | |
| 2012/0287939 A1* | 11/2012 | Leu | H04L 49/70 370/409 |
| 2013/0148976 A1 | 6/2013 | Patel et al. | |
| 2013/0177309 A1 | 7/2013 | El-Ahmadi et al. | |
| 2013/0179622 A1 | 7/2013 | Pratt et al. | |
| 2013/0194005 A1 | 8/2013 | Voutilainen et al. | |
| 2014/0019662 A1 | 1/2014 | Coffey | |
| 2014/0036920 A1 | 2/2014 | McCormick et al. | |
| 2014/0270762 A1 | 9/2014 | Li et al. | |
| 2014/0317249 A1 | 10/2014 | Janakiraman et al. | |

OTHER PUBLICATIONS

International Search Report and Written Opinion, mailed in PCT/US15/23077 on by ISA/US dated Jul. 7, 2015.

LHCB Online System Data Acquisition & Experiment Control. 2001. [retrieved on Sep. 4, 2015). Retrieved from the Internet:<URL: http://lhcb-comp.web.cern.ch/lhcb-comp/General/Publications/onlinetdr.pdf>.

International Search Report and Written Opinion, mailed in PCT/US15/039045 on by ISA/US dated Oct. 2, 2015.

International Search Report and Written Opinion, mailed in PCT/US2015/052847 by ISA/US dated Jun. 30, 2016.

International Search Report and Written Opinion, mailed in PCT/US2015/052924 by ISA/US dated Feb. 2, 2016.

International Search Report and Written Opinion, mailed in PCT/US2016/026714 by ISA/US dated Jul. 12, 2016.

* cited by examiner

DATA CENTER PATH SWITCH WITH IMPROVED PATH INTERCONNECTION ARCHITECTURE

CROSS-REFERENCE TO RELATED APPLICATIONS

This application claims priority to U.S. Provisional Application No. 62/020,894, filed on Jul. 3, 2014, entitled "Data Center Path Switch With Improved Path Interconnection Architecture" which is incorporated herein in its entirety by reference.

BACKGROUND

Field

The present disclosure relates generally to data center path switches typically used in data centers of enterprise networks and service provider networks, and more particularly to high density data center path switches having the capability of switching entire data paths with low latency path interconnections between input ports and the output ports.

Description of the Related Art

Telecommunication switching has a long history, evolving from manual switching to early automatic electro-mechanical switching systems, such as step-by-step switching systems and crossbar switching systems, to more recent electronic and optical switching systems.

Digital and optical switching systems allowed for substantial growth in the size of electronic switching systems to meet the needs of ever expanding communication networks. The progression to the more common digital and optical switching systems was spurred on a belief that newer semiconductor (e.g., VLSI) and optical devices met the need for high speed data transmissions.

With the evolution of telecommunication switching has been the evolution of computers and the information age. In order to manage the increase in data transmissions between computers, data centers came to be. Data centers have their roots in the huge computer rooms built during the early ages of the computing industry. Early computer systems were complex to operate and maintain, and required a special environment in which to operate. During the boom of the microcomputer industry in the 1980s, computers started to be deployed everywhere and systems, such as dedicated computers or servers, were developed to meet the demands created by the need to have the increasing number of computers communicate. During the latter part of the 20$^{th}$ century and early part of the 21$^{st}$ century, data centers grew significantly to meet the needs of the Internet Age. To maintain business continuity and grow revenue, companies needed fast Internet connectivity and nonstop operations to establish a presence on the Internet.

Today, data centers are built within the enterprise network, a service provider network, or a shared, colocation facility where the networks of many disparate owners reside. With the significant increase in business and individual use of the Internet, and the significant need for bandwidth to transmit high volumes of data, especially video and graphics, data centers are again under pressure to evolve to handle the boom in growth. However, data centers are typically very expensive to build, operate and maintain, and data center operators are searching for ways to reduce costs while increasing data processing and transmission capabilities, while meeting all reliability requirements.

To meet the ever increasing demands, network architectures have evolved over the years to address these pressures, with old methodologies and technologies giving way to newer and supposedly faster methodologies and technologies.

In order to meet the increased demands, data center network architectures have changed. Sometimes the changes to the network architecture require significant rerouting of network connections, and sometimes the network architecture needs to be dynamic, changing frequently. And, all this has to be achieved at today's fast rates with little or no failures or delays in the transmission of data.

To address such pressures data center network switches have evolved with the capability of switching data traffic on a packet-by-packet basis, which is known as packet switching. While packet switching can change the physical route of individual packets through the network, there are some network applications where the requirement is to switch all the data traffic from one physical route to a second physical route through the network, which is known as port switching, or path switching.

As seen in FIG. 1, current data center data center network switch architectures have a number of ports 108 interconnected by a switching core. The data center network switch 10 in FIG. 1 has a number of ports 108, switch logic 106, and a Central Processing Unit (CPU) 102. The data center network switch 10 may also have a management interface unit 104 that enables the data center network switch 10 to communicate with a management control unit 100 that configures the settings within data center network switch 10.

Each port 108 connects to switch logic 106 via data path 118. In operation, switch logic 106 receives a data stream from a particular port 108 and transfers or switches the data stream to an outgoing port 108 as defined by configuration settings from management control unit 100.

FIG. 2 shows more details of the architecture of the switch logic 106. Port 108, also called a transceiver, has a receiver which receives a data stream from a remote end via external medium 126, and a transmitter which transmits a data stream to the remote end via external medium 126. Path 118, between port 108 and switch logic 106, is shown here separated into two paths: path 114 is the data flow direction from port 108 to switch logic 106 which is referred to here as the receive direction, while path 112 is the data flow direction from switch logic 106 to port 108, which is referred to here as the transmit direction.

The data center network switch 10 receives a Physical Layer data stream on an input port 108A, extracts packets (e.g., the data and header information) from the data stream via switch logic 106, and then transmits the packets (e.g., the data and header information) out a Physical Layer data stream on output port 108B. More specifically, in the data center network switch configuration of FIG. 2, port 108A receives a Physical Layer data stream (or signal) from the external medium 126A, which may be a wireless, Cat 6, Cat 6a, optical fiber, or other physical connection, and converts the data stream (or signal) from the Physical Layer data stream (or signal) form into an electrical data signal that can be used within the switch logic, separates the serial data and recovered timing information from the Physical Layer data stream (or signal), and passes the serial data stream, via connection 114A, into a Serial/Deserializer 120 (here SerDes 120A). The SerDes 120A converts the serial data stream into a parallel interface format for Media Access Control (MAC) sub-layer 122A. The MAC sub-layer 122A is an interface between a network's Data Link Layer's Logical Link Control (LLC) sub-layer and its Physical Layer, and provides the network's Data Link Layer functions, including frame delimiting and identification, error checking, MAC addressing, and other functions. Packets are parsed by the MAC layer 122A, where header fields are extracted and passed via interface bus 110 to CPU 102, which interprets the header information.

The data center network switch management control unit 100 communicates information, such as configuration information, alarm information, status information, to the management interface unit 104, via control path 116. Routing tables 128 contain information to direct incoming packets on a particular port 108 to outgoing packets on a particular port 108. The Routing tables 128 may be determined by known discovery protocol software within data center network switch 10, or CPU 102 may receive configuration information from the management control unit 100 to set up a particular routing table configuration. CPU 102 looks up the output destination route for a packet, and modifies the outgoing packet header, if necessary.

Switch fabric 124 then transfers the packet to an outgoing queue in outgoing MAC layer 122B. Outgoing MAC layer 122B formats the outgoing packet for transmission, and performs other Data Link Layer functions, such as generating a frame check sequence for outgoing packets. The completed packet is then fed to outgoing SerDes 120B, which converts the parallel data stream into a serial data stream. The serial data stream is then fed to the outgoing port 108B, which converts the data stream into a physical layer signal, adds physical layer timing, and transmits the physical layer signal out port 108B to external medium 126B.

Within current data center network switches 10, the number of steps to transfer an incoming physical layer signal from an incoming port 108 to an outgoing port 108 adds transmission delays and necessitates modifications to the outgoing packet. The current state of packet switches has latency issues of about and in excess of 500 nsec per packet, which is insufficient for today's data centers.

Further, a single data center network switch core can support only a relatively small number of ports. For a very large number of ports, data center network switch cores have to be configured in hierarchical or mesh configurations, which adds complexity to the network, decreases reliability, and further increases latency.

Turning to path switching, in today's data centers, network applications may employ; 1) an electrical-electrical-electrical path switch, 2) an electrical-optical-electrical path switch, 3) an optical-electrical-optical path switch, and/or 4) an optical-optical-optical path switch.

Various switching techniques have been used to implement such path switching methodologies. Examples include crosspoint switching, space switching, time slot switching, and wavelength switching to interconnect paths from an incoming port to outgoing port. However, today's demand for higher port counts in data center path switches restricts the above path switching techniques that may be employed to achieve high density, high speed path switching. Factors associated with such path switching techniques, such as high cost, low manufacturing yield, low reliability, high data latency, signal loss, power consumption, heat dissipation, and real estate, have heretofore prevented the expansion of path switching in today's high speed, high density data center data center path switches.

Currently available optical crosspoint switching technologies include electronic crosspoint switches, waveguides, beam steering, Micro-Electro-Mechanical Systems (MEMS), tunable filters, liquid crystal switching, and thermo-optical polymers solutions.

However, MEMS for example, has low reliability due to moving parts (e.g., mirrors), and requires corrective circuitry to ensure accurate beam alignment to correct for mirror misalignment. Another problem with MEMS is that as the number of ports being switched increases, the number of mirrors must significantly increase, further increasing the low reliability, mirror misalignment and path set up latency concerns. Increasing the number of mirrors also leads to more distance between the ports and the mirrors, which creates an issue known as beam divergence, where each individual beam widens as it passes from mirror to mirror resulting in signal loss along the path.

Physical sizes of MEMS hardware is also a problem and there are cost issue with current MEMS applications. For example, to create 320×320 port solutions in a MEMS application would require a physical size of 7 data center Rack Units (RU) in a data center cabinet or rack.

Beam steering has similar issues where as the number of ports to interconnect rises, the angular range increases and alignment and distortion effects exceed the capabilities of transmitting reliable signals.

With waveguide crosspoint switching, methods of path interconnections using ink-jet or thermo capillary techniques to pass or reflect an optical signal along the waveguide. However, using ink-jet or thermo capillary techniques to pass or reflect an optical signal along a waveguide typically generates significant heat, which creates heat dissipation and reliability issues.

Further, the different optical crosspoint switching techniques noted above are not capable of scaling in size to support large production applications required in today's data center networks. With most of these crosspoint path switching techniques, complexity and costs rise exponentially as the number of ports increases making it very expensive to meet the demands on today's data centers.

SUMMARY

The present application relates to a data center path switch that implements a path interconnection architecture to simplify current data center path switching structures. Preferably, the data center path switch according to the present application utilizes a path interconnection architecture that enables the switching of data streams on a channel of an ingress side of the path interconnection architecture to any one of the channels on an egress side of the path interconnection architecture, or to enable the switching of data streams on a channel of an ingress side of the path interconnection architecture to multiple channels on an egress side of the path interconnection architecture.

The data center path switch according to the present application increases the density within the path interconnection unit and depending upon the intended embodiment, can provide a blocking or a non-blocking interconnect solution while simplifying the control and path interconnections when switching ports.

The data center path switch according to the present application is also capable of switching optical and electrical signals from one external medium interface port to another similar medium interface port with no loss in performance across the path interconnection architecture. The data center path switch according to the present application is also capable of switching optical signals from optical medium interface ports to electrical medium interface ports with no loss in performance across the path interconnection architecture. The data center path switch according to the present application is also capable of switching electrical signals from electrical medium interface ports to optical medium interface ports with no loss in performance across the path interconnection architecture. The data center path switch according to the present application is also capable of switching optical signals of one wavelength from optical medium interface ports to optical medium interface ports with a different optical wavelength with no loss in performance across the path interconnection architecture.

The data center path switch according to the present application preferably provides optical or electrical signal regeneration such that there is no signal quality loss while achieving low latency along the path interconnections, as compared to current data center path switch architectures.

The data center path switch according to the present application may provide diagnostic and port status information to management layer functions for statistic information and for troubleshooting Physical Layer path connection issues.

Preferably, the path interconnection architecture used in the data center path switch according to the present application is capable of scaling to several thousand ports with equivalent reliability and performance and can be designed as a modular architecture.

In an alternate embodiment, the path interconnection architecture in the data center path switch according to the present application permits the selective establishment of test monitor taps and multicast or broadcast connections with no power level signal loss or latency in the outgoing side of the path interconnection architecture.

Preferably, the data center path switch according to the present application can provide end to end path identification using, for example, managed connectivity interfaces capable of identifying each of the cables connected to the data center path switch.

An example of an embodiment of the data center path switch according to the present application includes a set of ports, a path interconnection unit, and a control unit. Each port within the set of ports is configured to receive data streams from an external medium, and to transmit data streams to an external medium. The path interconnection unit has an ingress side with a set of paths equal to the number of ingress ports in the set of ports, and an egress side with a set of paths equal to the number of paths on the ingress side. The path interconnection also includes an electrical based switching fabric that is configured to switch data streams on any one ingress side path to any one egress side path or multiple egress side paths. The latency of data streams switched from a receiving port to a transmitting port is less than 500 nsec. The control unit is connected to the path interconnection unit and is configured to control the switching fabric to switch data streams from a path on the ingress side to one or more paths on the egress side.

Another example of an embodiment of the data center path switch according to the present application includes a set of ports in a one RU configuration having a capacity that is scalable from 16 ingress ports and 16 egress ports to at least 128 ingress ports and 128 egress ports. Each port within the set of ports is configured to receive data streams from an external medium, and to transmit data streams to an external medium. A path interconnection unit is also provided. The path interconnection unit has an ingress side with a set of paths equal to the number of ingress ports in the set of ports, and an egress side with a set of paths equal to the number of paths on the ingress side, and an electrical based switching fabric that is configured to switch data streams on any one ingress side path to any one or multiple egress side paths. A control unit is connected to the path interconnection unit and is configured to control the switching fabric to switch data streams from a path on the ingress side to a path on the egress side.

DETAILED DESCRIPTION

Figure 1:
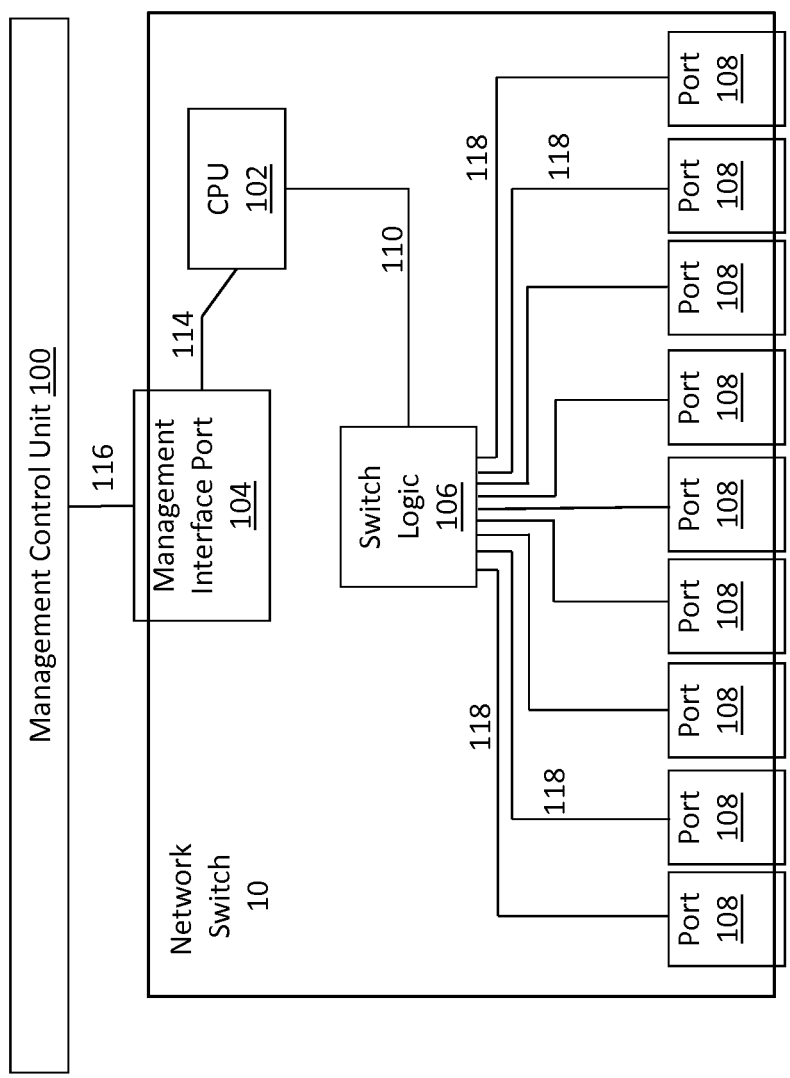
FIG. 1 is a block diagram of a data center network switch architecture within the prior art.
Figure 2:
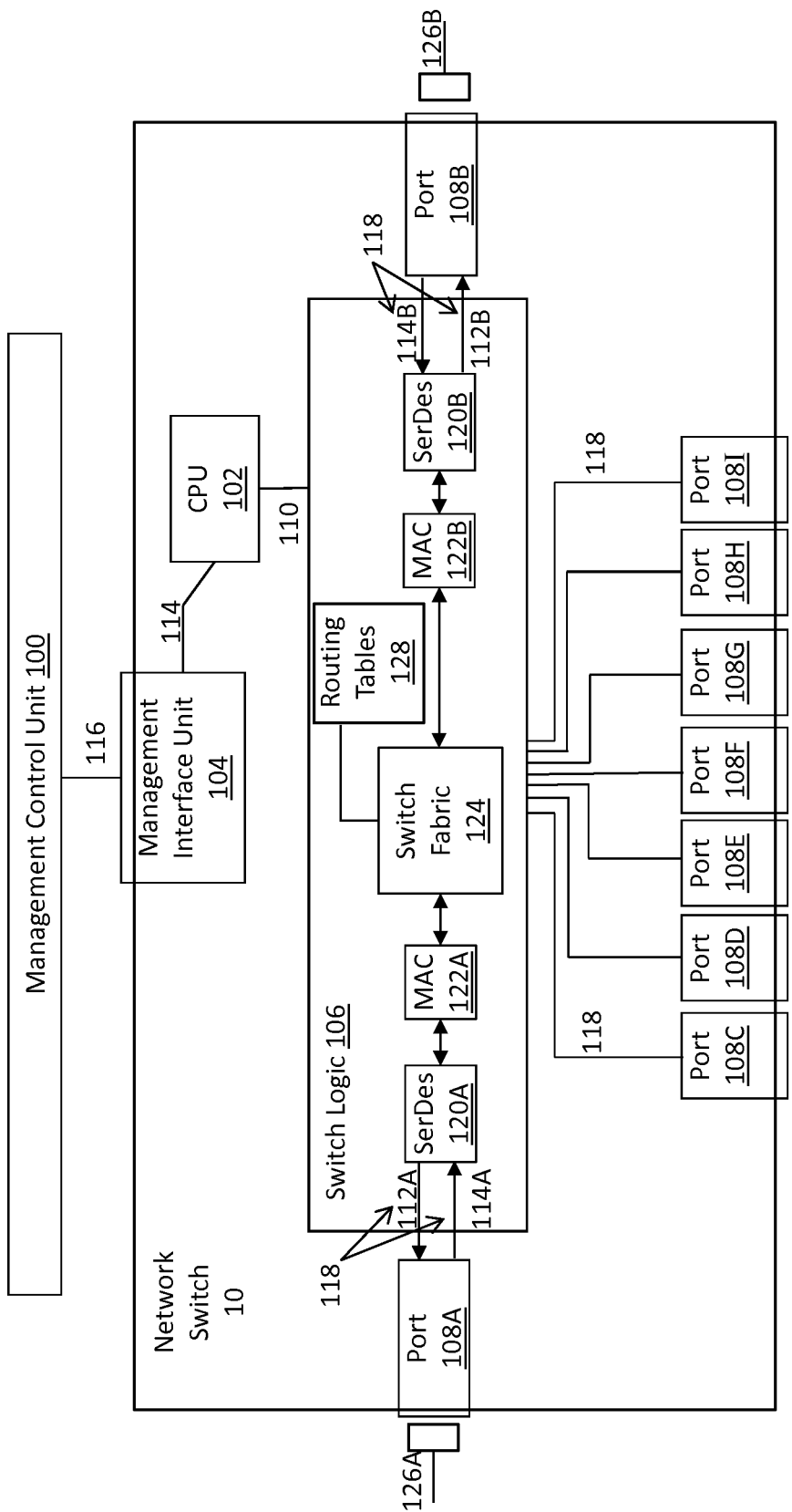
FIG. 2 is a block diagram of the data center network switch architecture of FIG. 1, detailing the switch logic.
Figure 3:
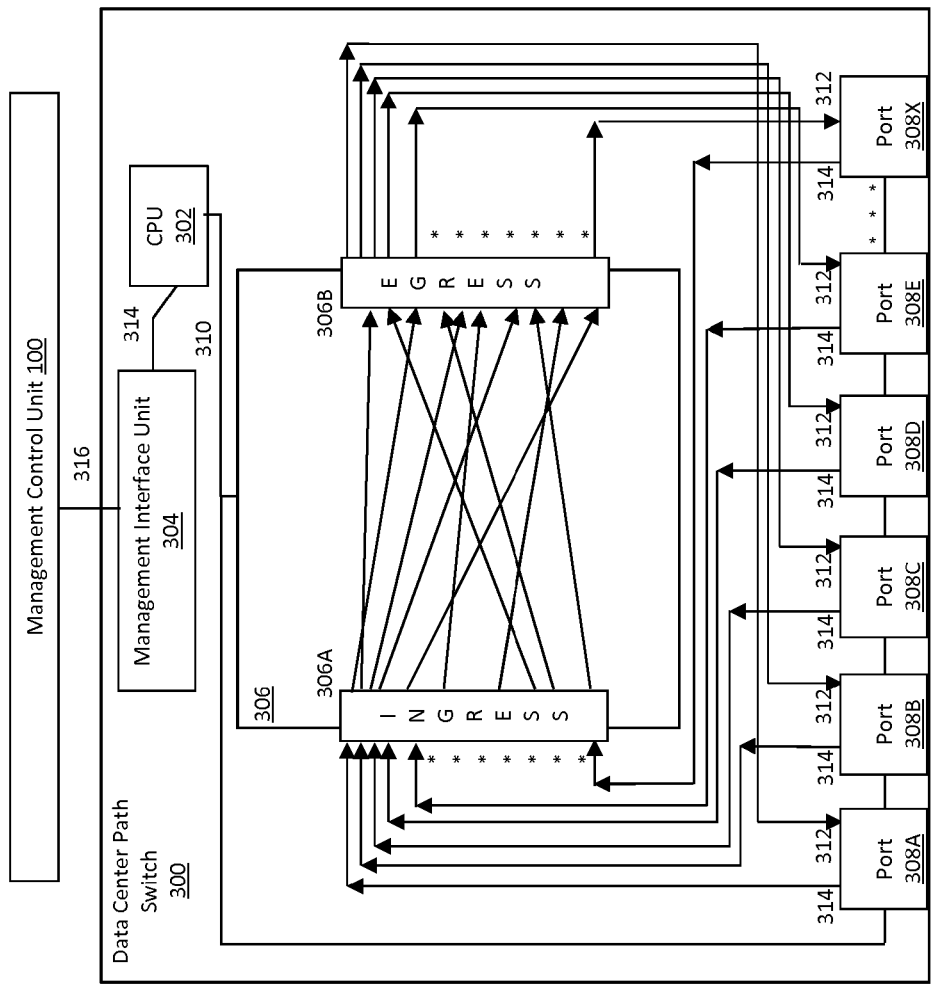
FIG. 3 is a block diagram of an exemplary embodiment of a data center path switch according to the present application, illustrating a general path interconnection unit with ingress and egress sides.

Referring now to FIG. 3, an exemplary architecture of the path switch 300 according to the present application is provided. In this embodiment, the path switch 300 includes a set of ports 308, path interconnection unit 306, management interface unit 304 and CPU 302. The number of ports 308 and the bandwidth per port of the set of ports 308 is generally set by the capability of the path interconnection unit 306. Preferably, the ports are transceiver ports capable of receiving Physical Layer signals from various mediums, converting the signals into a form that can be routed by the path interconnection unit 306, and converting signals from the form routed by the path interconnection unit 306 to a form for transmission as a Physical Layer signal through a port 308 onto an external medium capable of handling such Physical Layer signal. The configuration of the data center path switch is such that the latency between an input port and an output port is less than 500 nsec, and preferably less than 10 nsec at about 5 nsec.

The path interconnection unit 306 is preferably configured such that it can transfer data streams from one channel of an ingress side 306A of the path interconnection unit 306 onto to any one channel on an egress side 306B of the path interconnection unit 306. The path interconnection unit may be an electronic matrix type switch, such as a crossbar or crosspoint switch. The electronic matrix type switch may use multiplexor arrays, selective transistor enabling, or other implementation to selectively choose one input to be interconnected to a single output, or to multiple outputs. A suitable matrix type switch is described in "A 10-Gb/s High-Isolation, 16×16 Crosspoint Switch Implemented With AlGaAs/GaAs HBT's", IEEE Journal of Solid State Circuits, Vol. 35, No. 4, April 2000, which is incorporated herein by reference. The capability exists within matrix type switches to enable multiple multiplexor arrays or transistors or other mechanism to connect one input port to one or more output ports. Other embodiments of matrix type switches may also provide the capability of connecting multiple inputs to a single output port simultaneously.

Figure 4:
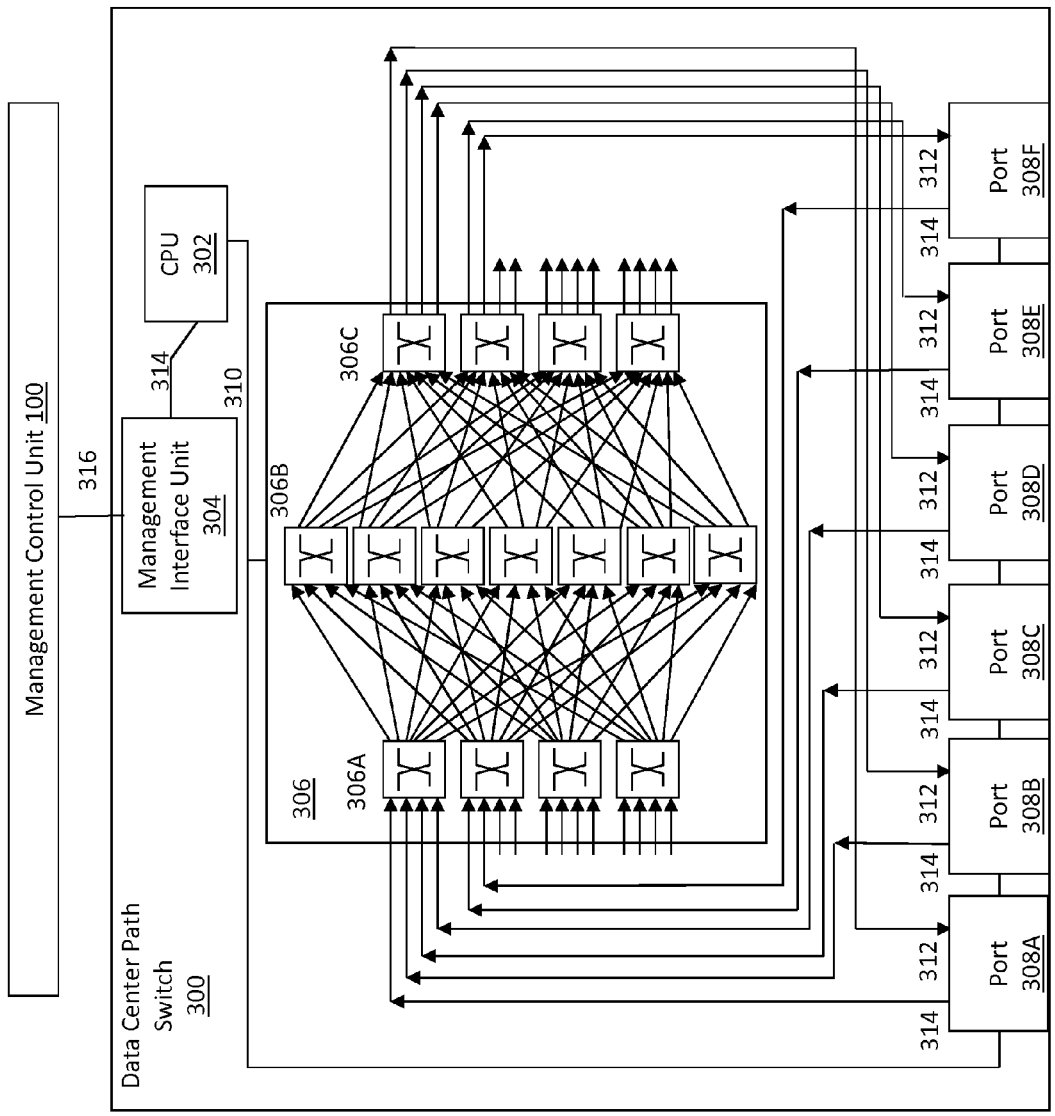
FIG. 4 is a block diagram of an exemplary embodiment of a data center path switch according to the present application, illustrating a multistage non-blocking path interconnection unit with ingress and egress sides.

Electronic matrix type switches can easily be designed to support a larger number of ingress and egress ports by cascading crosspoint groups into multistage path interconnection unit 306 having stages 306A, 306B and 306C, as shown in FIG. 4. As noted above, preferably the data center path switch has a port set that is capable of scaling from, for example, 16×16 ports to 128×128 ports in a single rack unit. As another example, using an electronic matrix type switch in the path interconnection unit allows a configuration that can scale to support ports sets of 320×320 ports or more in a single rack unit.

Control of the flow of a data stream through the path interconnection unit 306 is through the management interface unit 304 and the CPU 302. In the embodiment of FIG. 3, received Physical Layer signals are converted by ports 308 into electrical signals that are transferred to path interconnection unit 306.

The data center path switch 300 in the embodiment of FIG. 3, is configured by the management control unit 100 which communicates information, such as configuration information to CPU 302 via management interface unit 304 and control path 316. The configuration information is used by CPU 302 to configure the ports 308 and the path interconnection unit 306. An incoming path 314 on a particular port 308 may be assigned an outgoing path 312 to a particular port 308, which may be the same port or another port 308. In this way, the network topology can be reconfigured from one physical destination to another destination by the management control unit 100 modifying the configuration settings in path interconnection unit 306. As a result, network traffic can be redirected by software control without the need for manual human physical reconfiguration of the ports.

The data center path switch architecture of the present disclosure permits the hardware for ports 308 to be made configurable by software reconfiguration under control of the CPU 302. The data center path switch architecture can also be configured with automatic failover mechanisms for redundancy applications, such that in the event of a failed input or output port or loss of signal on a given port, the path interconnection port can be switched to utilize a different input port and or output port.

The data center path switch architecture of the present disclosure permits different ports 308 to be implemented to support different medium interfaces. For example, by designing the port interfaces 308 according to medium type the data center path switch topology can be reconfigured by medium type, such that path interconnection unit 306 can not only support each medium type, but also can provide an interconnection method from one medium type to another medium type. To illustrate, port 308A can be configured for a Cat 6 copper medium while port 308B can be configured for a fiber cable medium with both ports interconnected through path interconnection unit 306.

The connectors for ports 308 can include copper interfaces, such as Cat 5, Cat 6, Cat 7, and other RJ45 implementation variations, fiber channel interfaces, optical interfaces, such as SC, ST, FC, LC, MPO (sometimes called MTP), MXC, and other fiber type connections. The ports 308 can also consist of Small Form Factor (SFF) or other type of modular cages capable of accepting plug-in type transceivers, such as SFP, SFP+, QSFP, CFP, and other modular transceiver modules. In one embodiment, the data center path switch architecture of the present disclosure may consist entirely of electrical connectors. In another embodiment, the data center path switch architecture of the present disclosure may consist of a mixture of optical and electronic connectors.

Figure 5:
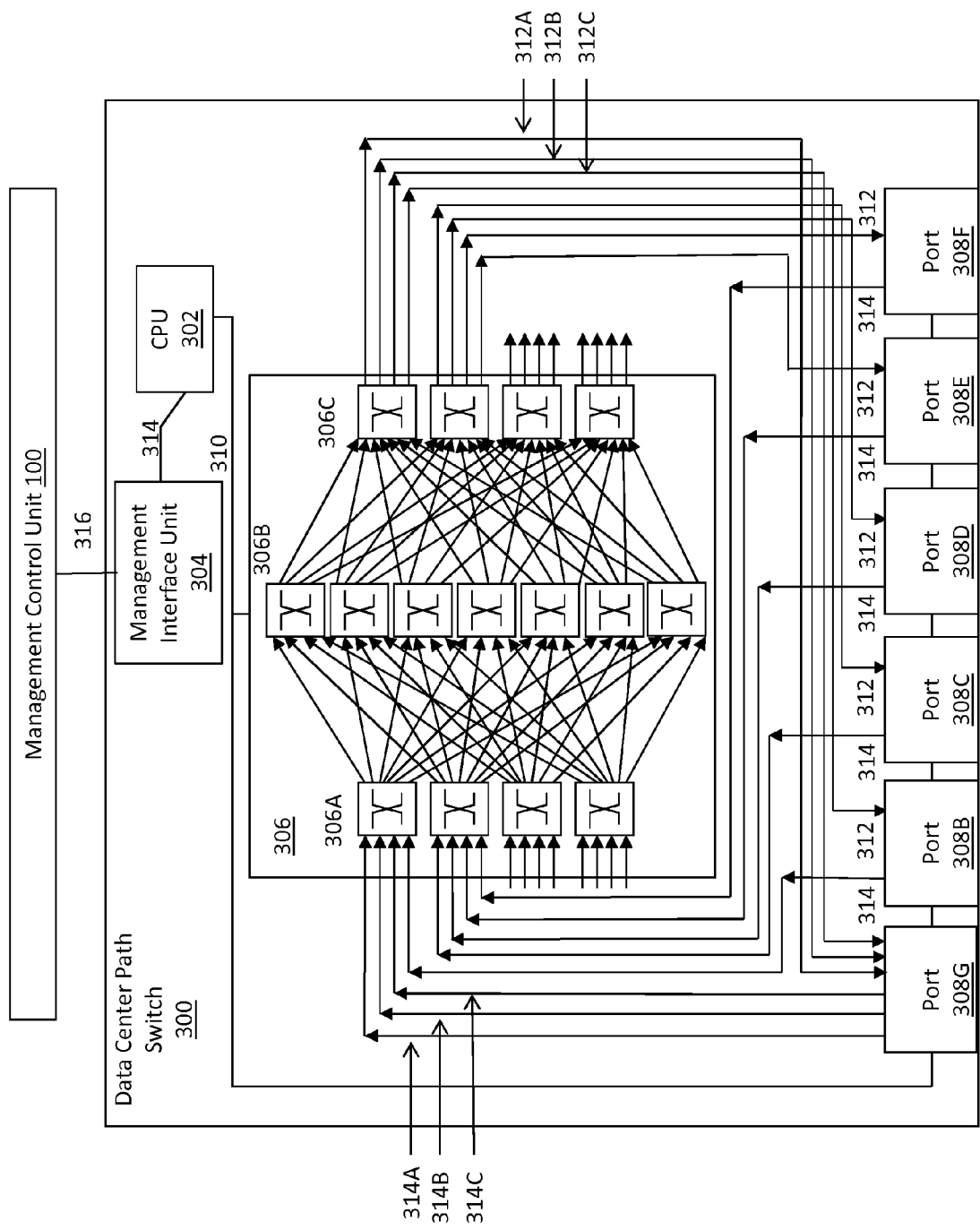
FIG. 5 is a block diagram of an exemplary embodiment of a data center path switch according to the present application, illustrating a multistage non-blocking path interconnection unit with ingress and egress sides and a port with a WDM transceiver configuration.

In another embodiment shown in FIG. 5, port 308G may consist of Wavelength Division Multiplexor (WDM) interfaces, such as Coarse Wavelength Division Multiplexor (CWDM), Dense Wavelength Division Multiplexor (DWDM), or other WDM capabilities, such as silicon photonics interfaces where multiple wavelengths may be received over a single input fiber. In this embodiment, the WDM transceiver interface would then split up the individual wavelengths and convert the signal from each optical wavelength to individual electrical paths 314A, 314B, 314C. The individual electrical paths 314A, 314B, 314C can then be switched as described previously within the path interconnection unit 306 to the selected output paths 312 as programmed into path interconnection unit 306 by CPU 302. Outputs from path interconnection unit 306 connect individual electrical paths 312A, 312B, 312C into the transmit side of WDM transceiver port 308G to be converted into different wavelengths to be transmitted out the WDM transceiver port 308G. One embodiment may have the path interconnection unit 306 configuration set to have all the WDM wavelengths from one input WDM transceiver port 308G connect via electrical paths 314A, 314B, 314C to a separate WDM transceiver port 308G (not shown) via electrical paths 312A, 312B, 312C. Another embodiment is to use path interconnection unit 306 to cross connect the different WDM channel input wavelengths from input WDM transceiver port 308G to different output wavelengths in the same outgoing WDM transceiver port 308G, e.g., connection paths 314A, 314B, 314C to paths 312C, 312B, 312A. Another embodiment is to connect the WDM transceiver port 308G to individual electrical paths 314A, 314B, 314C to separate individual ports 308B, 308C, 308D, 308E, or 308F, which may include interfaces, such as Cat 5, Cat 6, Cat 7, or other copper RJ45 implementation variations, fiber optical interfaces including SC, ST, FC, LC, MPO, MXC type connections, or to SFF or other type of modular cages intended to accept plug in transceivers such as SFP, SFP+, QSFP, CFP, and other modular transceiver modules.

In the data center path switch architecture of the present disclosure, since the intention is to create a very dense solution and small enclosure to reduce the data center real estate, the preferred embodiment application uses MPO or MXC type fiber connectors. Furthermore, to reduce the physical data center path switch size, the data center path switch preferably uses multiport fiber optic transceiver port chips, such as the Board-mount Optical Assembly transceivers, manufactured by Finisar Corporation.

The CPU 302 configures the ports 308 based on configuration information from management control unit 100. The CPU 302 also monitors each port's status and the status of the path from each port 308, and reports diagnostic and status information to the external management control unit 100 for statistics and troubleshooting.

Electrical and optical cable distances are range bound as signal quality may degrade as the signal distance increases from a transmitter, from insertion loss from connectors or cables, or from other impairments. The data center path switch architecture of the present disclosure terminates the incoming signal at ingress port 308 and then regenerates the output signal at egress port 308, which effectively resolves signal degradation. This solution can also be used in applications, such as extending the permissible distance of a path for example.

The scale of the configuration is dependent upon the size of the path interconnection, e.g., the crosspoint, implemented. The data center path switch architecture of the present disclosure is scalable by implementing path interconnection unit designs, either blocking or non-blocking, matrix type switches (e.g., crosspoint switches) and which may include single stage solutions or multistage solutions. Examples of such solutions include Banyan Networks, Batcher Networks, Batcher-Banyan Networks, Clos Networks, or other interconnection methodologies. One implementation configuration for the data center path switch architecture of the present disclosure can support in excess of 320×320 ports in a single RU with less than 10 nsec latency.

The data center path switch architecture of the present disclosure is intended to support path signal switching which switches the entire physical signal and does not interpret the data. As a result, the architecture can support multiple software protocols simultaneously across the path interconnection unit 306.

The data center path switch architecture of the present disclosure also permits the capability of grouping multiple paths together to provide parallel interface connections, such as 40 Gbps and 100 Gbps. In this configuration, parallel streams of 10 Gbps from an ingress 40 Gbps or 100 Gbps port 308 are bonded together within path interconnection unit 306 by using grouped interconnection paths which have low intra-path skew. In this configuration, parallel streams of 10 Gbps from an ingress 40 Gbps or 100 Gbps port 308 are bonded together within path interconnection unit 306 by configuring paths with similar routes through the circuitry comprising of paths 314, then through path interconnection unit 306 and then through paths 312 to create grouped interconnection paths which have low intra-path skew.

An alternate 100 Gbps implementation utilizes four lanes of 25 Gbps. For data rate translation with a 10 Gbps cross connect switch, a "Gearbox" PHY that multiplexes and de-multiplexes the four 25 Gbps channels to/from ten 10 Gbps channels can be used to convert a 100 Gbps interface utilizing 4 lanes of 25 Gbps channels into 10 lanes into/from the 10 Gbps lanes of the crosspoint switch. An example of one implementation using the Gearbox PHY is a BCM84790 from Broadcom Corp.

In an alternate configuration, parallel streams of 25 Gbps from an ingress 100 Gbps port 308 are bonded together within path interconnection unit 306 capable of supporting 25 Gbps or higher transmission paths by configuring paths with similar routes through the circuitry comprising of paths 314, then through path interconnection unit 306 and then through paths 312 to create grouped interconnection paths which have low intra-path skew.

Figure 6:
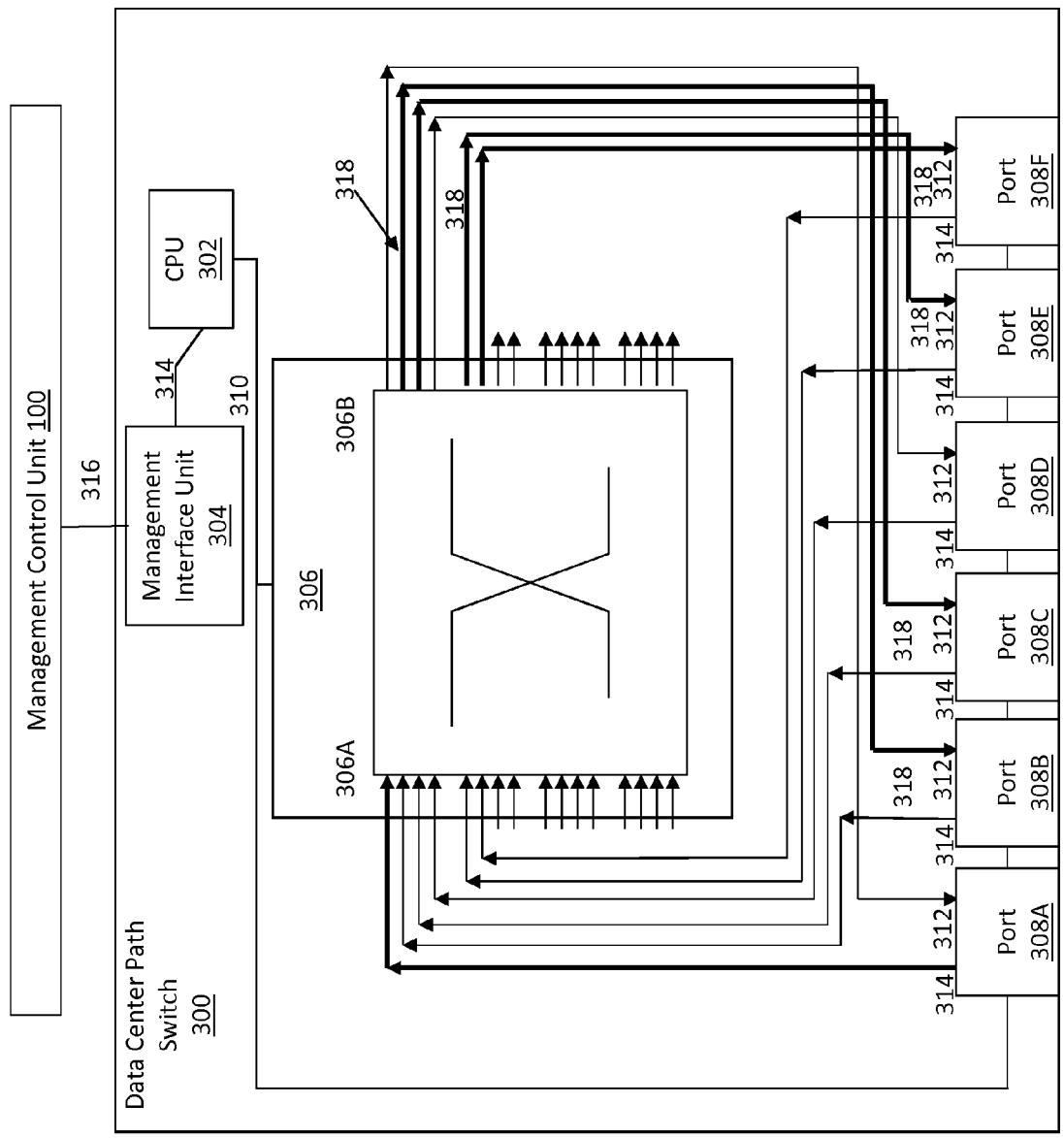
FIG. 6 is a block diagram of another exemplary embodiment of a data center path switch according to the present application, implementing a multicast application.

The data center path switch architecture of the present disclosure also permits the capability of providing broadcast from one port to all ports simultaneously, or providing multicast from one port to multiple ports simultaneously. FIG. 6 shows one example of a multicast implementation where port 308A is configure to receive traffic into the path interconnection unit and multicast the signal out of ports 308B, 308C, 308E, and 308F. Management control unit 100 communicates to management interface unit 304 the configuration settings for the broadcast or multicast implementation. CPU 302 then, via control bus 310, configures the path interconnection unit 306 in order to set up the path or channel connections necessary for the broadcast or multicast configuration. In the embodiment of FIG. 6, a data stream on path 314 from port 308A is connected by path interconnection unit 306 to ports 308B, 308C, 308E, and 308F via paths 318, which are identical paths in parallel from input path 314. The input paths 314 from ports 308B, 308C, 308E, and 308F may be connected (not shown) to other ports 308, or may not be connected anywhere within the path interconnection unit 306 (not shown).

Each fiber connector may have one or more associated Light Emitting Diodes (LEDs) used for status and control information. Each LED may be a single color or multicolor LED as determined for the product implementation. Each LED may have a blink rate and color used to identify specific states for the port. The LEDs can be illuminated by CPU 302 to indicate information and may include port status for a single active port or multiple ports for each connector. The LEDs can also be used during installation or Moves-Adds-and-Changes to indicate to data center personnel which connector port is to be serviced. CPU 302 may also indicate port status information by a Liquid Crystal Display (LCD) located near the panel connectors.

Figure 7:
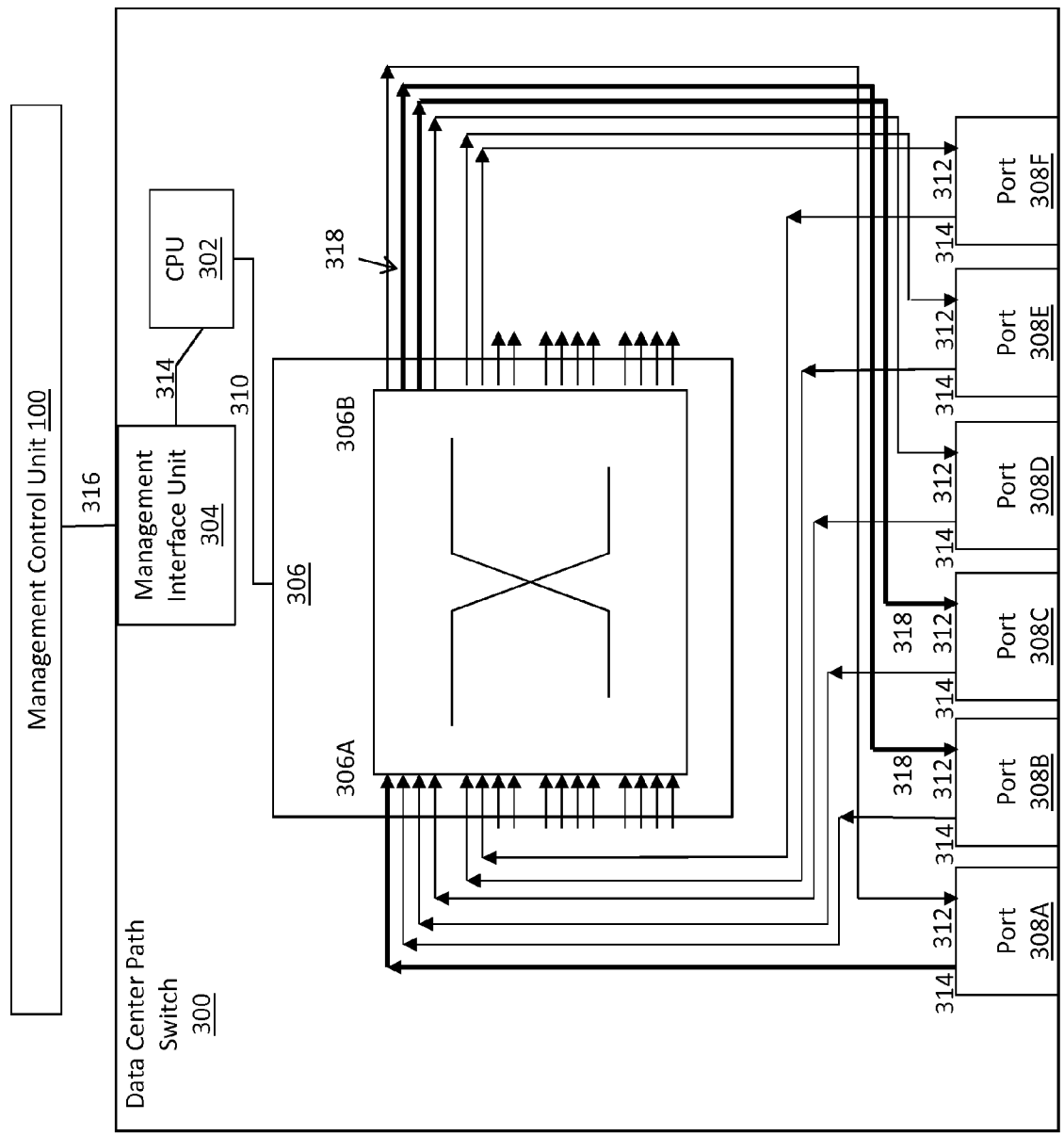
FIG. 7 is a block diagram of an exemplary embodiment of a data center path switch according to the present application implementing a test/monitor application.
Figure 8:
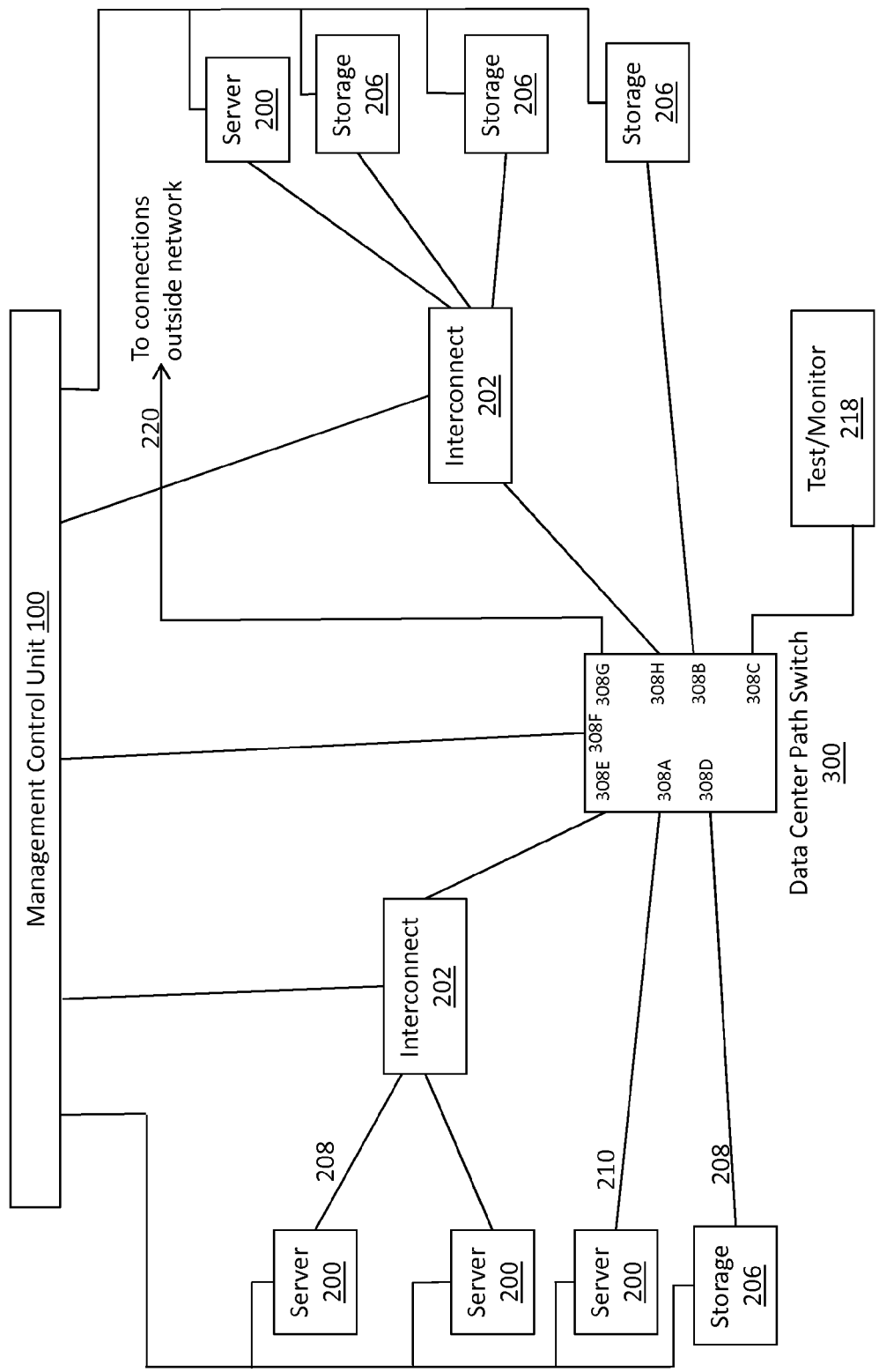
FIG. 8 is a block diagram of an exemplary embodiment of a data center path switch according to the present application implementing a test/monitor application in a network configuration.

The data center path switch architecture of the present disclosure also permits the implementation of configuring port mirroring ports in order to connect primary path data streams to test/monitor ports by allocating more than one network paths, as shown in FIG. 7 in the architecture similar to the multicast architecture of FIG. 6, which will steer the path from an incoming port to an outgoing network port plus also to a port designated to a test/monitor platform. In the embodiment of FIG. 7, path 314 from port 308A is fed into the path interconnection unit 306 and under configuration from CPU 302 is replicated within path interconnection unit 306 to produce two copies of path 314 designated as output paths 318. One copy of path 318 is fed to port 308B to the intended destination medium, while the other path 318 is fed to port 308C intended for a test/monitor platform external to the data center path switch 300, as seen in FIG. 8. Additionally, the receive path 314 from port 308B through path interconnection unit 306 to egress path 312 to outgoing port 308A may also be port mirrored within path interconnection unit 306 and the duplicated signal may be copied to a different port 308 for forwarding to the test/monitor platform as well. In this embodiment, the data center path switch architecture of the present disclosure provides via the management control unit 100, a network operator selectable path to the test/monitor platform, adds zero latency to the original communication path for test/monitor ports, eliminates the requirement of physically moving the connections, and eliminates any down time associated with setting up and removing the test/monitor connections.

Typical Network Taps are hardware devices which split an electrical or optical data stream into two segments—one path being connected to the original intended destination and the other path to the Test/Monitor system. The splitting of the optical signal using Network Taps reduces the signal power which in turn reduces the maximum distance the signal can reach before errors start occurring. Using the data center path switch architecture of the present disclosure eliminates the splitting and in fact increases the distance a signal can reach because the signal is regenerated in the data center path switch 300 by transceiver ports 308.

Preferably, the data center path switch architecture of the present disclosure may have multiple port mirroring ports for testing and or monitoring of any of the input signal paths to the data center path switch.

Figure 9:
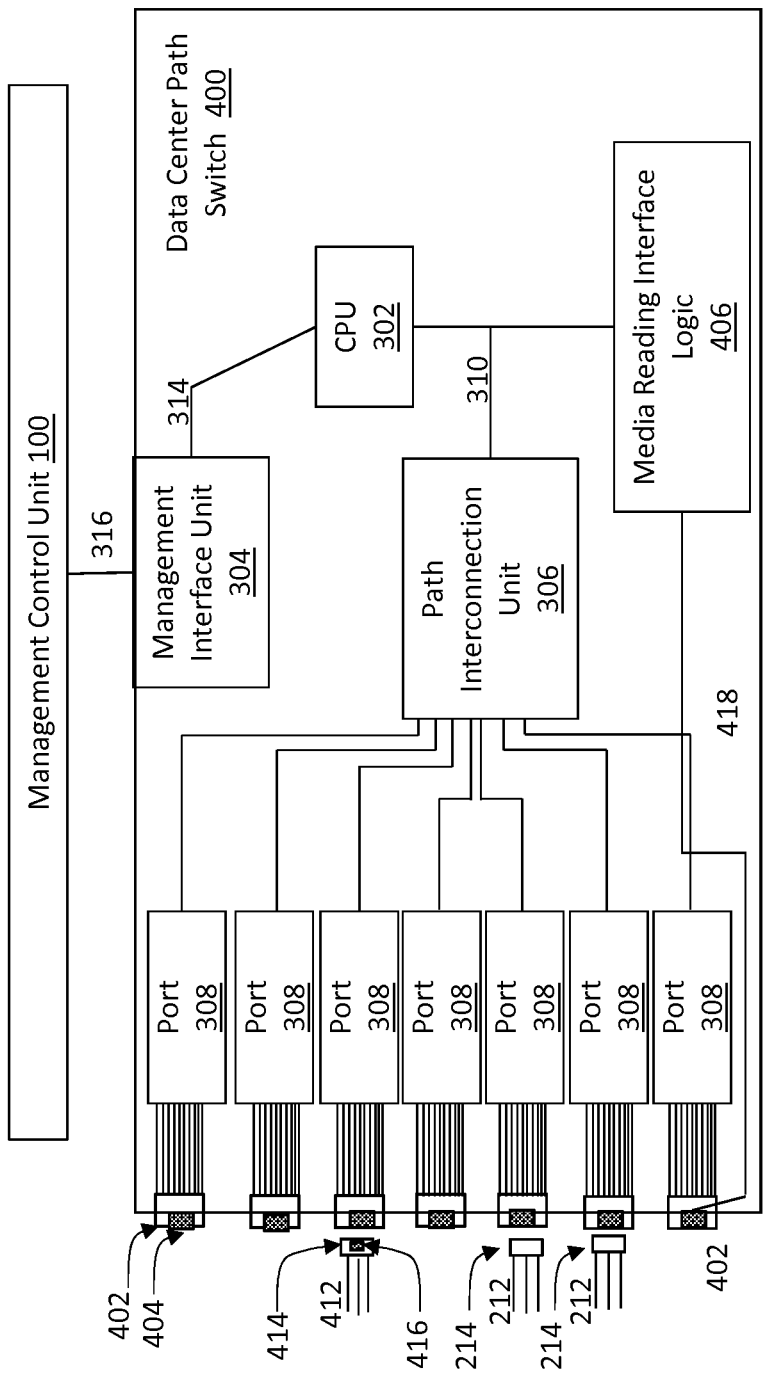
FIG. 9 is a block diagram of an exemplary embodiment of a data center path switch according to the present application implementing intelligent identification of cables.

Referring to FIG. 9, the architecture of the present disclosure also permits the implementation of the capability to interpret cable information from cables connected to the data center path switch 400, by obtaining intelligent information from within the cables. In this embodiment, the CPU 302 can then report the physical cable information to the management control unit 100. In addition to interfacing to standard cables 212, and intelligence equipped cables 412, adapter 402 has the capability, via interface 404, to detect the presence of a cable connector 214 or 414 inserted into intelligent adapter 402, and in the case of intelligence equipped cable connector 414, read specific cable information by reading the information in cable media 416. To ascertain cable information, the data center path switch 400 may be designed with ninth wire technologies interfaces, RFID tagging technology interfaces, connection point ID (CPID) technology interfaces, or other cable managed intelligence technologies. In another embodiment, the data center path switch 400 may be designed with one or more of these different technology interfaces in order to provide the capabilities of supporting more than one particular managed intelligent technology.

Each data center path switch 400 equipped with intelligent cable interfaces has the capability to determine the cable presence and/or cable information available to the interface depending upon the information provided from the intelligent cable.

The cable information read from media interface adapter 402 via media interface bus 418 by media reading interface logic 406 and provided to CPU 302 may consist for each cable connection of the cable type, cable configuration, cable length, cable part number, cable serial number, and other information available to be read by media reading interface logic 406. This information is collected by media reading interface logic 406 and passed to the CPU 302 via control bus 310. The CPU 302 then reports the information to management control unit 100. Management control unit 100 can use this information along with information received from other Data center Path Switches 400 to map out the end to end connection paths of each cable connected in the Data Center.

Figure 10:
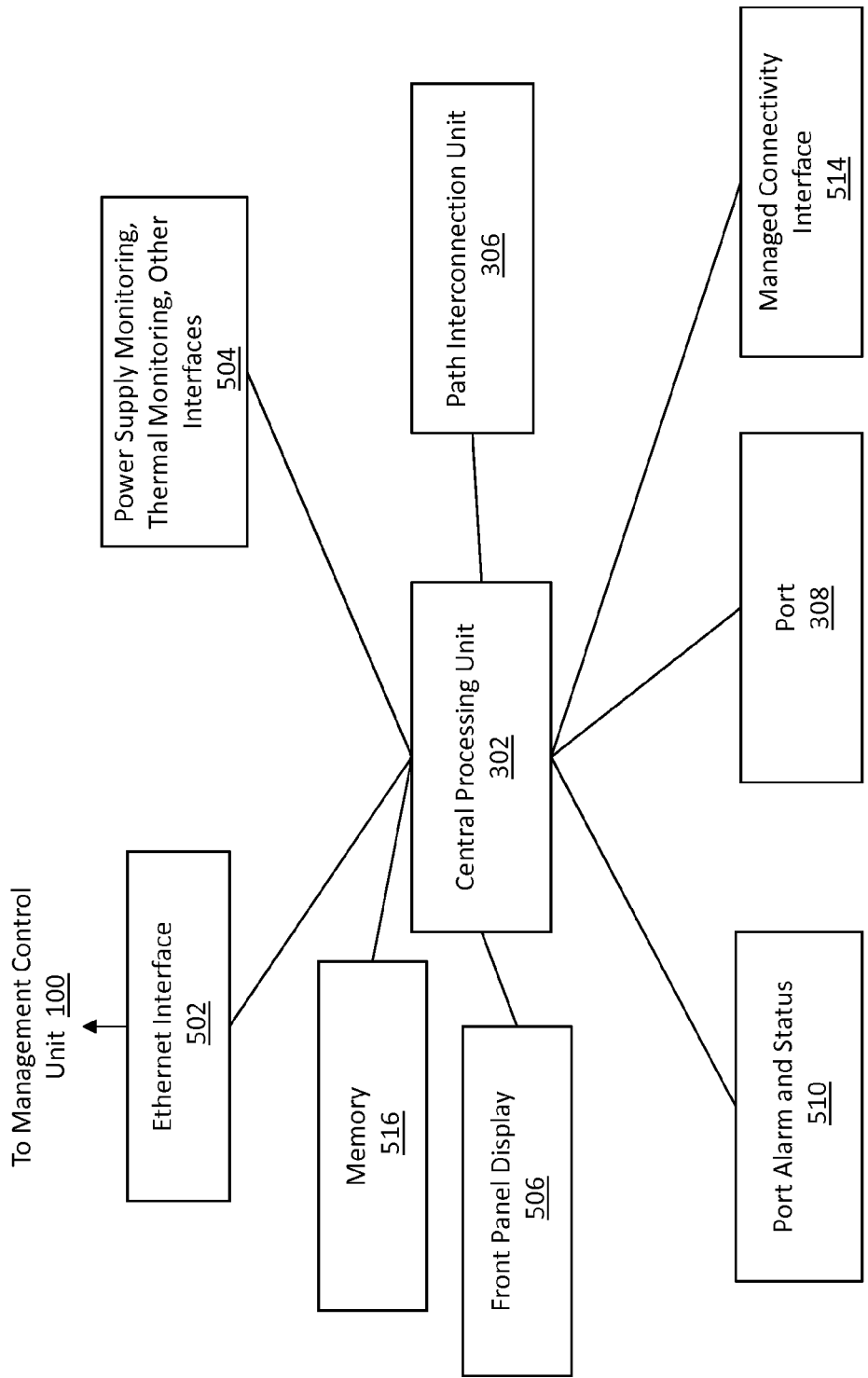
FIG. 10 is a block diagram of an exemplary embodiment of a data center path switch according to the present application detailing the internal functional logic blocks.

FIG. 10 shows an embodiment of the internal functional blocks of the data center path switch. In this embodiment, the CPU 302 configures the path interconnection unit 306 as well as the ports 308 and monitors the ports to ensure the port interfaces are functioning within expected normal operating parameters. Configuration of the path interconnection unit 306 and the ports 308 may be a one-time function upon power on sequence, or the configuration may be changed dynamically based upon external data center requirements depending on the implemented application.

Continuing to refer to FIG. 10, an Ethernet interface 502 is in communication with CPU 302 and is employed to exchange information between the CPU and the external management control unit 100. In one embodiment, the CPU may have configuration information pre-programmed in memory 516, while other embodiments may require programming based upon the actual implementation within a customer application. Memory 516 is also used for program software code and to retain port status and alarm information, front panel indication status power supply status, Managed Connectivity status and alarm information, Ethernet port configuration settings, Management Control interface information, and other related configuration and status information.

The Port alarm and status block monitors each port for change in status of a port 308 or a connection to that port 308 in order to report port status to the CPU 302 and if required to the Management Control Unit 100. Depending upon the configuration settings for a given embodiment, the CPU 302 may merely report the port status change or may switch out a failed physical port 308 and may connect an alternate port 308 through Path Interconnection Unit 306 in redundancy applications in order to provide an end-to-end connection for the path.

The Managed Connectivity Interface 514 controls media reading Interface logic 406 to detect the insertion, presence, and removal of a connector 214 or 414 within adapter 402 and then by reading media interface 416 if present to determine the cable and connector information from the inserted cable. This information is then reported to CPU 302 which in turn passes the information to Management Control Unit 100, Using this information, a software controlled touchless reconfigurable network where the management control unit 100 can modify the configuration of path interconnection unit 306 to create alternate routes within the network. In one configuration, the output ports 308 can provide additional parallel paths to a single destination node within the network to provide redundant connections which can be activated by the CPU 302, without the need for manual intervention, upon detection of a failure in the primary outgoing path connection to the destination node. In another configuration, once the physical connections have been made between the nodes or endpoints within the network, the management control unit 100 can reconfigure the network topology without requiring personnel to manually reconnect the interconnections. For example, alternate network reconfiguration implementations can be achieved by switching an input port 308 to an alternate port 308, which is connected to a different destination node or endpoint in the network. To further illustrate this example, an initial network configuration may have input from port 308B connected to a destination node "A" via outgoing port 308C. A network operator or the management control unit may decide to reconfigure the connections from port 308B to destination node "B" by reconfiguring path interconnection unit 306 to connect port 308B to port 308F. By configuring the network with alternate paths to different nodes or endpoint destinations, the path interconnection unit 306 can switch the route from a source to a new destination, thereby changing the network topology.

The data center path switch may also have peripheral functions, such as power supply and thermal monitoring unit 504, as well as front panel display 506 employed to manage hardware such as LEDs, LCDs, and/or other display methods, and may also have input mechanisms such as pushbuttons to provide input to the CPU. Additional logic blocks may also be added for various purposes. One example would be dedicated fail over hardware from one port 308 to one or more alternate ports 308 in case of failure of the primary port 308 for example.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system."

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is also to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A data center path switch, comprising:
a set of ports, wherein each port within the set of ports is configured to receive data streams from an external medium, and to transmit data streams to an external medium;
a path interconnection unit having an ingress side with a set of paths equal to the number of ports in the set of ports connected between the set of ports and the ingress side of the path interconnection unit in a one-to-one arrangement, an egress side with a set of paths equal to the number of paths on the ingress side connected between the set of ports and the egress side of the path interconnection unit in a one-to-one arrangement, and an electrical based switching fabric that is configured to switch data streams on any one ingress side path to any one egress side path such that data streams received on any one of the set of ports and be transmitted on any one of the set of ports, wherein the set of ports for the ingress side is that same set of ports for the egress side; and
a control unit connected to the path interconnection unit configured to control the switching fabric to switch data streams from a path on the ingress side to a path on the egress side; and
wherein the latency of data streams switched from a receiving port to a transmitting port is less than 500 nsec.

2. The data center path switch according to claim 1, wherein the latency of data streams switched from a receiving port to a transmitting port is less than 10 nsec.

3. The data center path switch according to claim 1, wherein the set of ports and path interconnection unit are configured as a non-blocking path switch.

4. The data center path switch according to claim 1, wherein the path interconnection unit comprises a matrix of switches of sufficient size such that a data stream on the ingress side can be switched to any one of the paths on the egress side.

5. The data center path switch according to claim 1, wherein the switching fabric is configured to switch data streams on any one ingress side path to more than one egress side path.

6. The data center path switch according to claim 1, wherein a data stream from a receiving port comprised of one medium type is converted within the path switch such that such data stream is transmitted by a transmitting port of a different medium type.

7. The data center path switch according to claim 1, wherein a data stream from a receiving port comprised of an electrical medium type is converted within the path switch such that such data stream is transmitted by a transmitting port of an optical medium type.

8. The data center path switch according to claim 1, wherein a received data stream is at a first data rate is converted into a second data rate at the path interconnection unit.

9. The data center path switch according to claim 1, wherein each port in the set of ports includes a connector capable of connecting to the external medium.

10. The data center path switch according to claim 9, wherein at least one of the port connectors comprises a copper connector.

11. The data center path switch according to claim 9, wherein at least one of the port connectors comprises one of a simplex or duplex fiber connector.

12. The data center path switch according to claim 9, wherein at least one of the port connectors comprises a high density fiber connector.

13. The data center path switch according to claim 9, wherein at least one of the port connectors has one or more associated LEDs used for status and control information.

14. The data center path switch according to claim 1, wherein each port in the set of ports includes a transceiver.

15. The data center path switch according to claim 14, wherein the transceiver comprises a pluggable transceiver in an SFF modular cage.

16. The data center path switch according to claim 14, wherein the transceiver comprises a WDM transceiver.

17. The data center path switch according to claim 1, wherein one or more of the ports in the set of ports comprise managed connectivity ports capable of reading a physical location identification from a managed connectivity port from an external medium connected to the one or more ports in the set of ports.

18. A data center path switch, comprising:
a set of ports in a one RU configuration having a capacity that is scalable from 16 ingress ports and 16 egress ports to at least 128 ingress ports and 128 egress ports, wherein each port within the set of ports is configured to receive data streams from an external medium, and to transmit data streams to an external medium;
a path interconnection unit having an ingress side with a set of paths equal to the number of ports in the set of ports connected between the set of ports and the ingress side of the path interconnection unit in a one-to-one arrangement, an egress side with a set of paths equal to the number of paths on the ingress side connected between the set of ports and the egress side of the path interconnection unit in a one-to-one arrangement, and an electrical based switching fabric that is configured to switch data streams on any one ingress side path to any one or more egress side paths such that data streams received on any one of the set of ports and be transmitted on any one of the set of ports, wherein the set of ports for the ingress side is that same set of ports for the egress side; and a control unit connected to the path interconnection unit configured to control the switching fabric to switch data streams from a path on the ingress side to a path on the egress side.

* * * * *